(12) United States Patent
Baker et al.

(10) Patent No.: US 6,856,813 B2
(45) Date of Patent: Feb. 15, 2005

(54) RADIO COMMUNICATION SYSTEM

(75) Inventors: Matthew P. J. Baker, Canterbury (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 716 days.

(21) Appl. No.: 09/912,653

(22) Filed: Jul. 25, 2001

(65) Prior Publication Data

US 2002/0016179 A1 Feb. 7, 2002

(30) Foreign Application Priority Data

| Jul. 26, 2000 | (GB) | ............................................. 0018482 |
| Feb. 9, 2001 | (GB) | ............................................. 0103229 |

(51) Int. Cl.⁷ ............................................... H04B 1/00
(52) U.S. Cl. ......................... 455/522; 370/318; 455/69
(58) Field of Search ........................ 455/69, 522, 13.6, 455/452.2, 453, 504; 370/318

(56) References Cited

U.S. PATENT DOCUMENTS

| 4,910,504 A | 3/1990 | Eriksson ..................... 340/712 |
| 5,056,109 A | 10/1991 | Gilhousen et al. ............. 375/1 |
| 6,330,462 B1 * | 12/2001 | Chen ........................... 455/572 |

FOREIGN PATENT DOCUMENTS

| EP | 1011211 A1 | 6/2000 | ........... H04B/7/26 |
| WO | WO0041466 | 7/2000 | ........... H04B/7/005 |
| WO | WO0042716 | 7/2000 | ........... H04B/7/005 |
| WO | WO0074260 | 12/2000 | ........... H04B/7/005 |

* cited by examiner

*Primary Examiner*—Nick Corsaro
(74) *Attorney, Agent, or Firm*—Dicran Halajian

(57) ABSTRACT

A radio communication system has improved power control of transmissions between a first station and a second station. The second station adjusts the power of its transmissions to the first station in response to power control commands received from the first station. The first station determines when it has synchronised to transmissions from the second station and informs the second station of synchronisation. After synchronisation has been signalled, the rate of adjustment of transmission power by the second station is increased (508). The changed rate of power control can be achieved by adjustments to the power control step size, or by other modifications to the response of the second station to received power control commands or to its rate of reception of power control commands.

These techniques overcome the problem that, because synchronisation can take a significant time to be established, there is a danger that transmission power may be increased too much and cause unacceptable interference.

11 Claims, 3 Drawing Sheets

RADIO COMMUNICATION SYSTEM

The present invention relates to a radio communication system and further relates to primary and secondary stations for use in such a system and to a method of operating such a system. While the present specification describes a system with particular reference to the emerging Universal Mobile Telecommunication System (UMTS), it is to be understood that such techniques are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many communication systems one of the functions of the control information is to enable power control. Power control of signals transmitted to the BS from a MS is required so that the BS receives signals from different MS at approximately the same power level, while minimising the transmission power required by each MS. Power control of signals transmitted by the BS to a MS is required so that the MS receives signals from the BS with a low error rate while minimising transmission power, to reduce interference with other cells and radio systems. In a two-way radio communication system power control is normally operated in a closed loop manner, whereby the MS determines the required changes in the power of transmissions from the BS and signals these changes to the BS, and vice versa.

An example of a combined time and frequency division multiple access system employing power control is the Global System for Mobile communication (GSM), where the transmission power of both BS and MS transmitters is controlled in steps of 2 $d$B. Similarly, implementation of power control in a system employing spread spectrum Code Division Multiple Access (CDMA) techniques is disclosed in U.S. Pat. No. 5,056,109.

A problem with these known techniques is that at the start of a transmission, or after the transmission is interrupted, the power control loops may take some time to converge satisfactorily. Until such convergence is achieved data transmissions are likely to be received in a corrupted state if their power level is too low, or to generate extra interference if their power level is too high.

One known solution to this problem, disclosed in our International Patent Application WO 00/42716 is to delay the start of data transmissions by a time sufficient for the power control to have converged sufficiently to enable satisfactory reception of data transmissions. This period between the start of the control transmissions and that of data transmissions is known as a power control preamble. However, in some systems part of the power control preamble period is used for synchronisation (where the BS derives the received timings of the MS transmissions, for example by locking onto the code used by the MS in a CDMA system). Hence there is a danger that the transmission power of the MS increases to a level that causes unacceptable interference before the BS becomes synchronised.

This problem is partially addressed in one UMTS embodiment by the BS transmitting particular patterns of power control commands before synchronisation is achieved which patterns avoid the MS making rapid changes in transmit power.

An object of the present invention is to address the problem of appropriate power control at the start of a transmission.

According to a first aspect of the present invention there is provided a radio communication system having a communication channel between first and second stations, wherein the second station comprises receiver means for receiving power control commands from the first station and power control means for adjusting the power of its transmissions to the first station in response to the power control commands, the first station comprises means for determining when it has synchronised to transmissions from the second station and signalling means for signalling to the second station that synchronisation has been achieved, and the second station comprises means responsive to notification that synchronisation has been achieved for modifying the operation of the station to enable the rate of change of transmission power to be greater after synchronisation has been signalled by the first station than before.

Signalling by the first station that it has achieved synchronisation enables the second station to modify its behaviour in a range of ways which increase the rate of change of its transmission power. For example, the second station could increase its power control step size after synchronisation. The second station could also ignore some power control commands before synchronisation is achieved, possibly by turning off its receiver.

According to a second aspect of the present invention there is provided a station for use in a radio communication system having a communication channel between the station and another station, wherein means are provided for determining when it has synchronised to transmissions from the other station and signalling means are provided for signalling to the other station that synchronisation has been achieved.

According to a third aspect of the present invention there is provided a station for use in a radio communication system having a communication channel between the station and another station, wherein receiver means are provided for receiving power control commands from the other station, power control means are provided for adjusting the power of its transmissions to the other station in response to the power control commands, and means are provided, responsive to notification that synchronisation has been achieved, for modifying the operation of the station to enable the rate of change of transmission power to be greater after synchronisation has been signalled by the other station than before.

According to a fourth aspect of the present invention there is provided a method of operating a radio communication system having a communication channel between first and second stations, wherein the second station comprises a receiver for receiving power control commands from the first station and a power controller for adjusting the power of its transmissions to the first station in response to the power control commands, the method comprising the first station determining when it has synchronised to transmissions from the second station and signalling to the second station that synchronisation has been achieved, and in response to the notification the second station modifying its operation to enable the rate of change of transmission power to be greater after synchronisation has been signalled by the first station than before.

Embodiments of the present invention will now be described, by way of example, with reference to the accompanying drawings, wherein.

In the drawings the same reference numerals have been used to indicate corresponding features.

Figure 1:
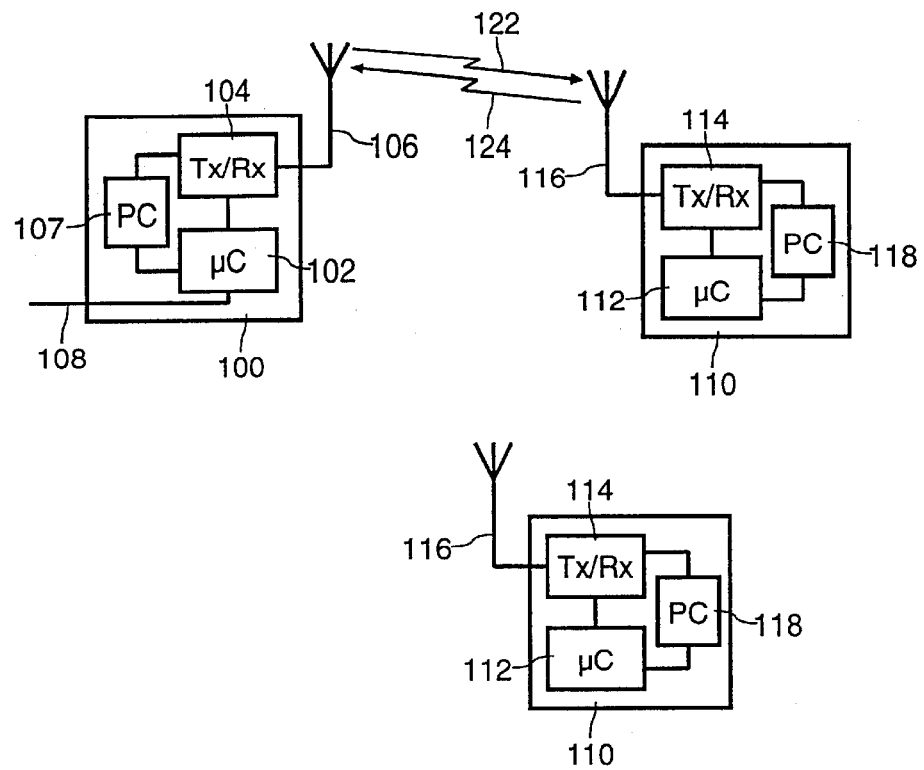
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller ($\mu$C) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller ($\mu$C) 112, transceiver means (Tx/Rx) 114 connected to antenna means 116, and power control means (PC) 118 for altering the transmitted power level. Communication from BS 100 to MS 110 takes place on a downlink frequency channel 122, while communication from MS 110 to BS 100 takes place on an uplink frequency channel 124.

Figure 2:
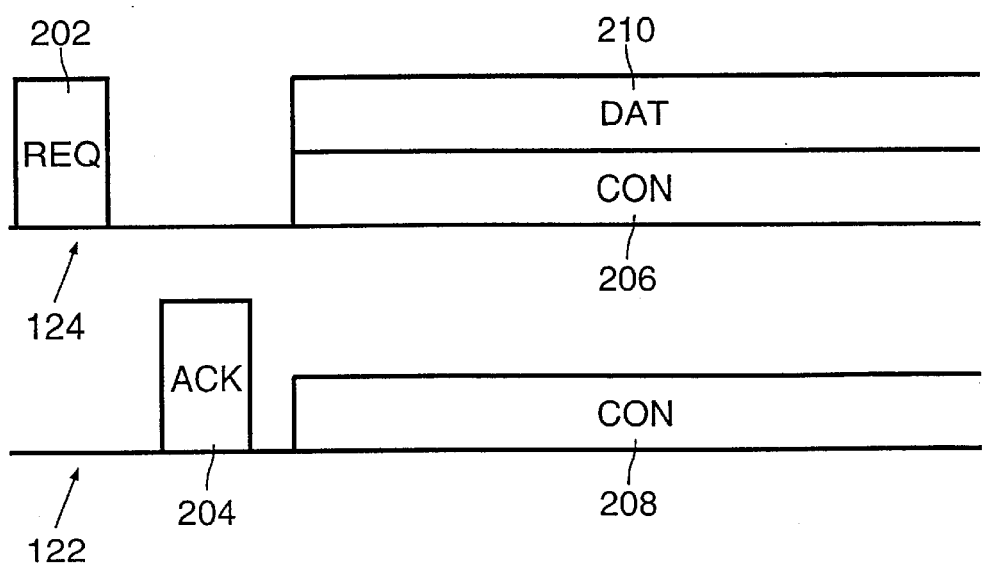
FIG. 2 illustrates a conventional scheme for establishing a communication link.

One embodiment of a UMTS frequency division duplex system uses a scheme illustrated in simplified form in FIG. 2 for establishing a communication link between MS 110 and BS 100. The link is initiated by the MS 110 transmitting a request 202 (REQ) for resources on the uplink channel 124. If it receives the request and has available resources, the BS 100 transmits an acknowledgement 204 (ACK) on the downlink channel 122 providing the necessary information for communication to be established. After the acknowledgement 204 has been sent, two control channels (CON) are established, an uplink control channel 206 and a downlink control channel 208, and an uplink data channel 210 is established for transmission of data from the MS 110 to the BS 100. In some UMTS embodiments there may be additional signalling between the acknowledgement 204 and the establishment of the control and data channels.

In this scheme separate power control loops operate in both uplink 124 and downlink 122 channels, each comprising an inner and an outer loop. The inner loop adjusts the received power to match a target power, while the outer loop adjusts the target power to the minimum level that will maintain the required quality of service (e.g. bit error rate). However, this scheme has the problem that when transmissions start on the control channels 206, 208 and data channel 210 the initial power levels and quality target are derived from open loop measurements, which may not be sufficiently accurate as the channels on which the measurements were made are likely to have different characteristics from the newly initiated channels. The result of this is that data transmissions at the start of the data channel 210 are likely to be received in a corrupted state if they are transmitted at too low a power level, or to generate extra interference if they are transmitted at too high a power level.

Figure 3:
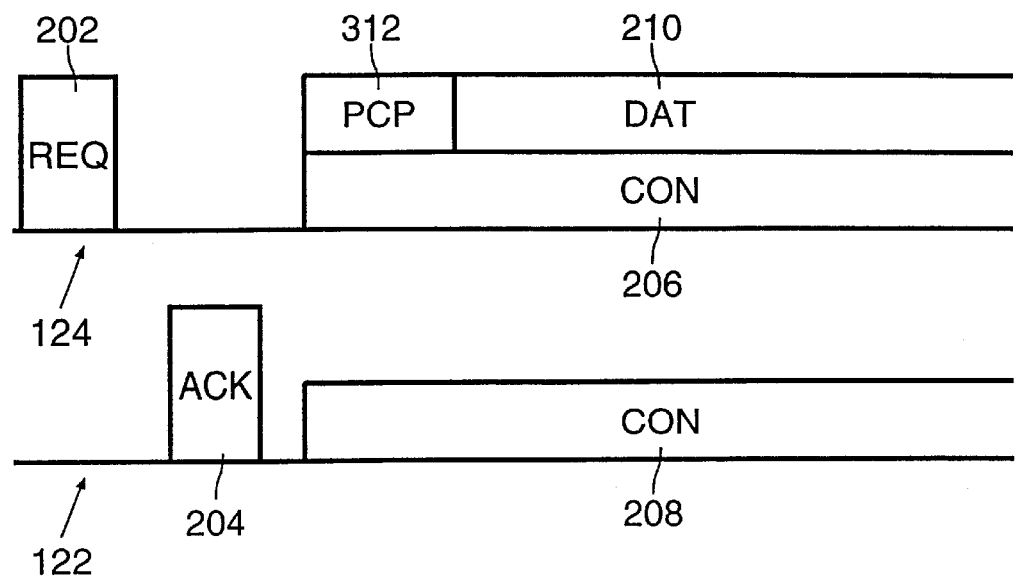
FIG. 3 illustrates a known scheme for establishing a communication link having a delayed start to data transmission.

One known solution to this problem, disclosed in our International Patent Application WO 00/42716 and illustrated in FIG. 3, is to delay the start of the uplink data transmission 210 by a period 312 which is long enough for the power control to have converged sufficiently to enable satisfactory reception of data transmissions by the BS 100. This period 312 is known as a power control preamble (PCP), and typically comprises a delay of one or more frames (each of length 10 ms). The delay 312 can be predetermined, or alternatively it can be determined dynamically, either by the MS 110 (which could detect convergence by monitoring downlink power control information) or the BS 100. The additional overhead in the transmission of extra control information on the control channels 206, 208 is balanced by a reduced Eb/No (energy per bit/noise density) for the user data received by the BS 100 over the data channel 210.

The purpose of the power control preamble period 312 is to enable the inner power control loop to cause the transmission powers in the uplink 124 and downlink 122 channels to converge on their respective required levels before the start of data transmission. Hence, a larger power control step size than normal may be used for the uplink channel 124 during the power control preamble 312. One method of implementing this is disclosed in our International Patent Application WO 00/41466, in which a large power control step size is used initially, with the step size being reduced when the required power adjustment changes sign.

However, the use of a large power control step size gives rise to a further problem. The initial part of the uplink power control preamble 312 may be required by the BS 100 to enable it to synchronise to the uplink control channel transmission 206. The use of a larger step size before the BS 100 becomes synchronised could result in the MS 110 increasing its transmission power sufficiently to cause an unacceptable level of interference in the cell.

Figure 4:
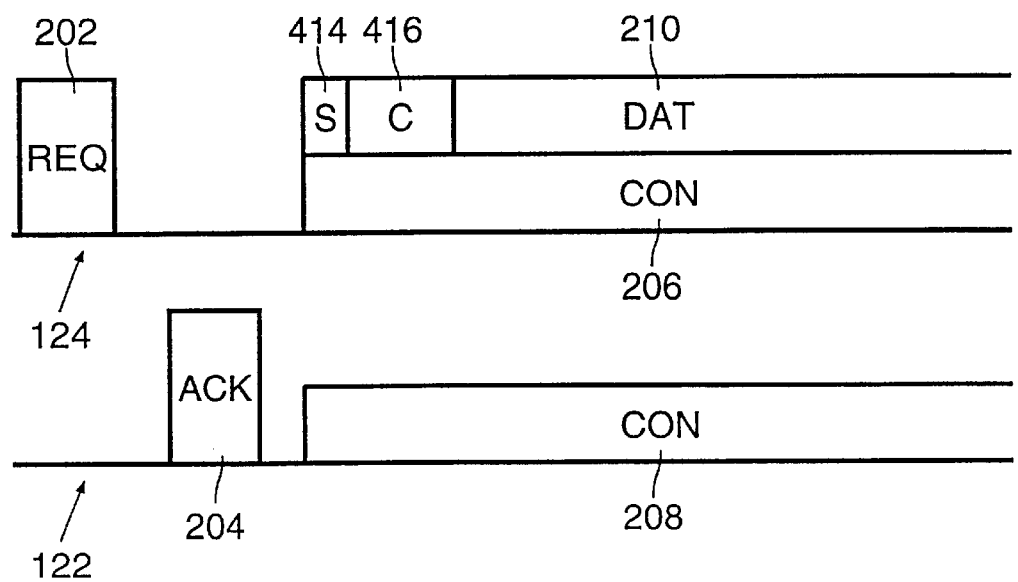
FIG. 4 illustrates an improved scheme for establishing a communication link having a delayed start to data transmission.

This problem can be avoided in a system made in accordance with the present invention by delaying the use of a larger power control step size until some time after the start of the power control preamble 312. This solution is shown in FIG. 4 in which the power control preamble 312 is split into two parts, a synchronisation part (S) 414, to enable the BS 100 to synchronise with transmissions from the MS 110, and a power control convergence part (C) 416. During the synchronisation part 414 a small (or even zero) power control step size is used, while a larger step size is used initially during the power control convergence part 416. As an alternative to using a smaller power control step size, the rate at which power control commands are issued could be reduced. As a further alternative, use of a smaller power control step size could be emulated by the MS 110 only adjusting its output power after receipt of a plurality of power control commands from the BS 100, as disclosed in our International Patent Application WO 00/74260 (unpublished at the priority date of the present application) and required in some UMTS embodiments. A range of other techniques may also be applied, for example the MS 110 could use a gated reception technique, in which it turns off its receiver for predetermined time periods.

The common factor between all of the above methods is that the rate of power adjustment is lower during the synchronisation part 414 of the power control preamble 312 than it is during the power control convergence part 416. The length of the synchronisation part 414 could be predetermined. For example, in a UMTS embodiment where the length of the power control preamble 312 is one frame (which is subdivided into 15 slots), some simulations suggested that a suitable length for the synchronisation part 414 could be 6 slots. This leaves 9 slots for power control convergence to be achieved.

Figure 5:
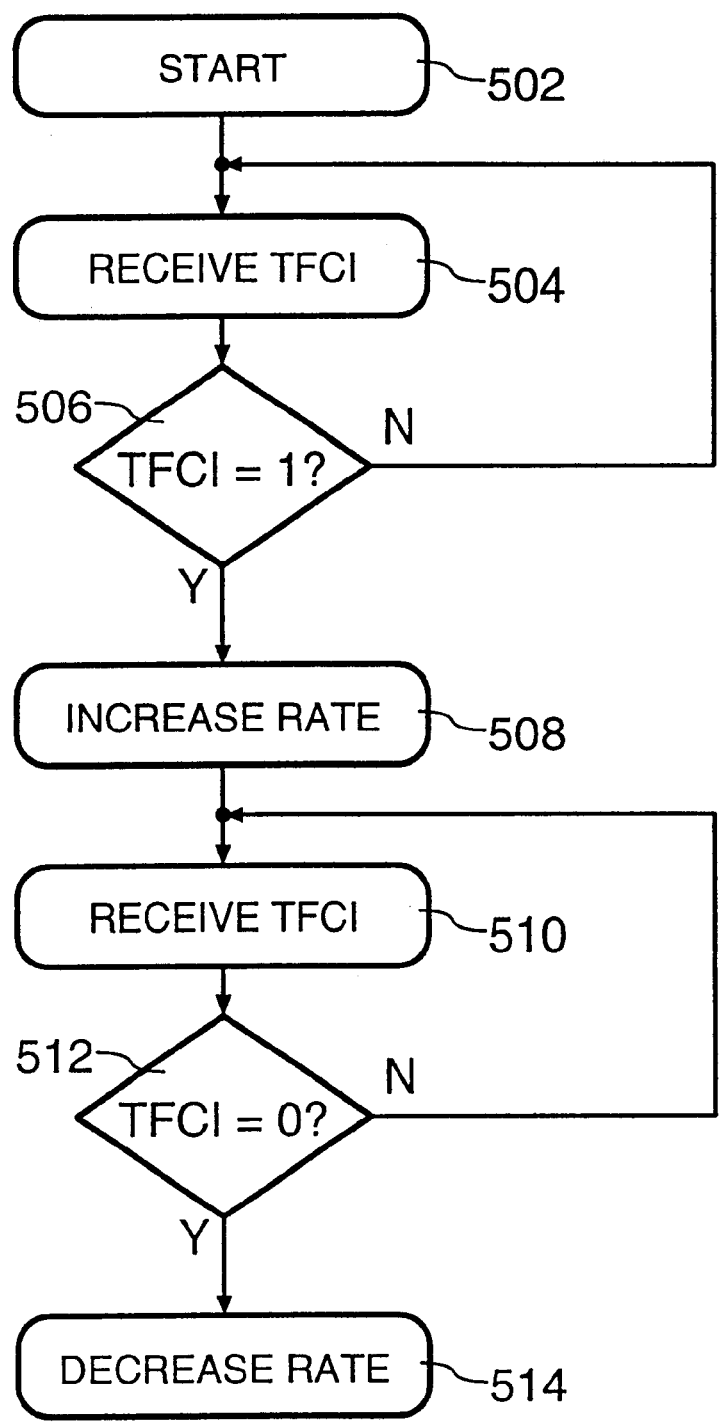
FIG. 5 is a flow chart illustrating a method in accordance with the present invention for adjusting the rate of change of transmission power during a power control preamble period.

Alternatively, the BS 100 could signal to the MS 110 when it obtained synchronisation. FIG. 5 is a flow chart illustrating one embodiment of such a scheme, which is a particularly convenient method of performing the scheme in a UMTS embodiment using the Transport Format Combination Indicator (TFCI) field. The TFCI field is present in the majority of slot formats in transmissions on the downlink 122, and comprises 2, 4, 8 or 16 bits per slot in the present UMTS specification. The TFCI bits are typically all set to '0' during the power control preamble 312.

The method starts, at step 502, with the MS 110 setting its power control adjustment rate to a small (or zero) value at the start of the synchronisation part 414. The MS then repeatedly receives TFCI bits, at step 504, and tests at step 506 whether the bits are set to '1'. The BS 100 signals that synchronisation has been achieved by switching to transmitting TFCI bits set to '1', thereby signalling the end of the synchronisation part 414 and the start of the power control convergence part 416. On detection of this change, the test at step 506 is passed and the MS 110 proceeds to increase its power control adjustment rate, at step 508, to improve the power control convergence. Embodiments of the present invention may operate power control at a lower rate than normal before synchronisation is achieved, and/or at a higher rate than normal immediately after synchronisation is achieved.

The test at step 506 may require examination of the value of each TFCI bit as it is received. Alternatively, the test 506 could operate on the value of all TFCI bits received in a slot. In this case the pattern of TFCI bits in a slot need not be all the same. However, considering the case of four bits per slot, a change from 0000 to 1111 has significantly more chance of being detected correctly than a change from, for example, 0101 to 1111 in the presence of noise. A further advantage of requiring all bits to be the same is that it may leave as an implementation-dependent option for the MS 110 whether the test 506 operates as each TFCI bit is received (thereby minimising the length of the synchronisation part of the power control preamble 312) or on the set of bits received during a slot (thereby improving robustness to errors in reception).

The period during which the larger power control adjustment rate is used could be determined in the same way as disclosed in our International Patent Application WO 00141466, by reducing the step size when the downlink power control commands change sign for the first time. Alternatively, use of the larger adjustment rate could be terminated after a predetermined number of slots. Hence, it is not necessary for the power control convergence part 416 to last until the end of the power control preamble 312.

A further improvement, which would overcome the effect of errors in power control commands that might cause the power control adjustment rate to be reduced too soon, would be for the BS 100 to signal when the target Signal to Interference Ratio (SIR) from the MS 110 had been reached. One possible implementation of this improvement is also illustrated in FIG. 5. Once the MS 110 has increased its power control adjustment rate, at step 508, it continues to receive TFCI bits, at step 510, and test whether the bits are set to '0', at step 512. The BS 100 signals that convergence has been achieved by setting the TFCI bits back to '0', in response to which the test at step 512 is passed and the MS 110 reduces its power control adjustment rate, at step 514. The test 512 could either operate on single TFCI bits or sets of bits, in the same way as test 506.

The present invention may also be applied to a system where there is no power control preamble 312, i.e. control and data transmissions start simultaneously, or to a system where data transmission begins before synchronisation has been achieved. In such a system, when the BS 100 determines that it has synchronised to transmissions from the MS 110 it signals this information to the MS 110. The signalling may be in any convenient manner, including use of the downlink control channel 208, use of TFCI bits as described above, or use of a predetermined pattern of power control commands.

The MS 110 is controlled so that the power control adjustment rate is lower before synchronisation is signalled than after. As well as varying the power control step size, as discussed above, such a result could be achieved by the MS 110 ignoring some fraction of the power control commands transmitted by the BS 100. The MS 110 could even turn off the receiving part of its transceiver 114 for predetermined periods until it was signalled that synchronisation had been achieved. Other equivalent methods will be apparent to those skilled in the art.

Although the description above has examined data transmission on the uplink channel 124, the techniques are equally applicable to data transmission on the downlink channel 122 or to bidirectional transmissions. Although the present invention has been described in the context of improving power control at the start of transmissions between two stations, it may also be applicable in situations where synchronisation is temporarily lost.

Embodiments of the present invention have been described using spread spectrum Code Division Multiple Access (CDMA) techniques, as used for example in UMTS embodiments. However, it should be understood that the invention is not limited to use in CDMA systems. Similarly, although embodiments of the present invention have been described assuming frequency division duplex, the invention is not limited to use in such systems. It may also be applied to other duplex methods, for example time division duplex (although the power control rate in such a system would normally be limited to once per transmission burst).

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A radio communication system having a communication channel between first and second stations, wherein the second station comprises receiver means for receiving power control commands from the first station and power control means for adjusting the power of its transmissions to the first station in response to the power control commands, the first station comprises means for determining when it has synchronised to transmissions from the second station and signalling means for signalling to the second station that synchronisation has been achieved, and the second station comprises means responsive to notification that synchronisation has been achieved for modifying the operation of the station to enable the rate of change of transmission power to be greater after synchronisation has been signalled by the first station than before.

2. A system as claimed in claim 1, characterised in that the communication channel from the second station to the first station comprises a control channel for the transmission of control information and a data channel for the transmission of data and in that the second station comprises means for delaying the initial transmission of the data channel until after the initial transmission of the control channels.

3. A station for use in a radio communication system having a communication channel between the station and another station, wherein means are provided for determining when it has synchronised to transmissions from the other station and signalling means are provided for signalling to the other station that synchronisation has been achieved.

4. A station as claimed in claim 3, characterised in that the signalling means is operable to signal the achievement of synchronisation by modifying a regularly transmitted signal.

5. A station for use in a radio communication system having a communication channel between the station and another station, wherein receiver means are provided for receiving power control commands from the other station, power control means are provided for adjusting the power of its transmissions to the other station in response to the power control commands, and means are provided, responsive to notification that synchronisation has been achieved, for modifying the operation of the station to enable the rate of change of transmission power to be greater after synchronisation has been signalled by the other station than before.

6. A station as claimed in claim 5, characterised in that means are provided for modifying the response of the power control means to received power control commands in response to signalling that synchronisation has been achieved.

7. A station as claimed in claim 6, characterised in that the power control means is operable to use a larger power control step size after synchronisation has been achieved than before.

8. A station as claimed in claim 5, characterised in that the power control means is operable to ignore a proportion of the power control commands received before synchronisation has been achieved.

9. A system as claimed in claim 8, characterised in that the receiver means is turned off when power control commands are to be ignored.

10. A method of operating a radio communication system having a communication channel between first and second stations, wherein the second station comprises a receiver for receiving power control commands from the first station and a power controller for adjusting the power of its transmissions to the first station in response to the power control commands, the method comprising the first station determining when it has synchronised to transmissions from the second station and signalling to the second station that synchronisation has been achieved, and in response to the notification the second station modifying its operation to enable the rate of change of transmission power to be greater after synchronisation has been signalled by the first station than before.

11. A method as claimed in claim 10, characterised by the first station signalling the achievement of synchronisation by modifying a regularly transmitted signal.

\* \* \* \* \*